(12) United States Patent
Porte et al.

(10) Patent No.: US 10,144,498 B2
(45) Date of Patent: Dec. 4, 2018

(54) WALL MADE FROM A COMPOSITE MATERIAL REINFORCED SO AS TO LIMIT THE SPREAD OF A CRACK IN A DIRECTION

(71) Applicant: AIRBUS OPERATIONS SAS, Toulouse (FR)

(72) Inventors: Alain Porte, Colomiers (FR); Jacques Lalane, Saint Orens de Gameville (FR); Stéphane Dida, Fontenilles (FR)

(73) Assignee: Airbus Operations (SAS), Toulouse (FR)

( * ) Notice: Subject to any disclaimer, the term of this patent is extended or adjusted under 35 U.S.C. 154(b) by 461 days.

(21) Appl. No.: 13/713,952

(22) Filed: Dec. 13, 2012

(65) Prior Publication Data

US 2013/0183513 A1  Jul. 18, 2013

(30) Foreign Application Priority Data

Dec. 13, 2011 (FR) ...................... 11 61514

(51) Int. Cl.
| | |
|---|---|
| *B64C 1/40* | (2006.01) |
| *B32B 3/08* | (2006.01) |
| *B32B 27/08* | (2006.01) |
| *B64D 33/02* | (2006.01) |
| *B64C 1/00* | (2006.01) |

(52) U.S. Cl.
CPC .................. *B64C 1/40* (2013.01); *B32B 3/08* (2013.01); *B32B 27/08* (2013.01); *B32B 2262/00* (2013.01); *B32B 2307/5825* (2013.01); *B32B 2605/18* (2013.01); *B64C 2001/0072* (2013.01); *B64D 2033/0206* (2013.01); *Y02T 50/433* (2013.01); *Y10T 428/249921* (2015.04)

(58) Field of Classification Search
CPC ..... B32B 7/14; B32B 17/061; B32B 2262/00; B32B 7/08; B32B 3/08; B32B 27/08; B32B 3/10; B64C 1/40; B64C 2001/0072; B64D 2033/0206; B64D 2003/0206; B29C 70/088; B29C 70/688; B29C 70/865; Y10T 428/24851
USPC ............. 217/17; 428/201, 221, 297.1, 297.4, 428/299.1
See application file for complete search history.

(56) References Cited

U.S. PATENT DOCUMENTS

| | | | | |
|---|---|---|---|---|
| 2,401,281 | A | * | 5/1946 | Webb ........................ E04C 2/14 217/17 |
| 2,952,579 | A | * | 9/1960 | Merriman ..................... 428/118 |
| 4,647,063 | A | * | 3/1987 | Piringer et al. ............... 280/610 |

(Continued)

FOREIGN PATENT DOCUMENTS

GB    1400834    *  7/1975

OTHER PUBLICATIONS

Search Report for FR 1161514 dated Apr. 3, 2012.

*Primary Examiner* — Camie S Thompson
(74) *Attorney, Agent, or Firm* — Nixon & Vanderhye P.C.

(57) ABSTRACT

The invention relates to a wall made from a composite material comprising at least two layers of fibers (18, 18') embedded in a resin matrix, a crack being able to spread in said wall in a direction of propagation, characterized in that it comprises at least one longilineal metal reinforcement (20), oriented in a direction secant to the direction of propagation, inserted between two layers of fibers (18, 18') of the wall.

27 Claims, 5 Drawing Sheets

(56) References Cited

U.S. PATENT DOCUMENTS

| | | | |
|---|---|---|---|
| 6,187,411 B1* | 2/2001 | Palmer | B29C 70/543 |
| | | | 428/102 |
| 2004/0128947 A1* | 7/2004 | Ito | E01F 8/0017 |
| | | | 52/782.1 |
| 2005/0112348 A1 | 5/2005 | Schmidt et al. | |
| 2005/0136256 A1 | 6/2005 | Vichniakov | |
| 2006/0188696 A1* | 8/2006 | Grose | B32B 3/02 |
| | | | 428/156 |
| 2010/0133380 A1* | 6/2010 | Roebroeks et al. | 244/119 |
| 2013/0040117 A1* | 2/2013 | Porte et al. | 428/201 |

* cited by examiner

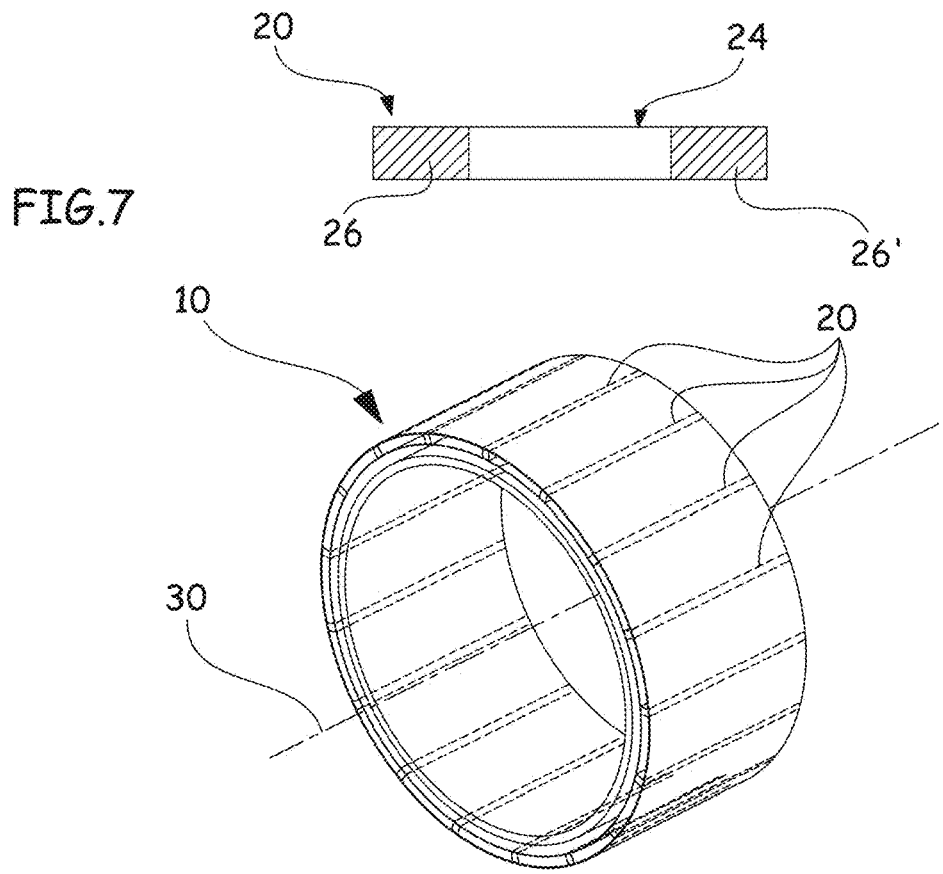
FIG.7
FIG.8
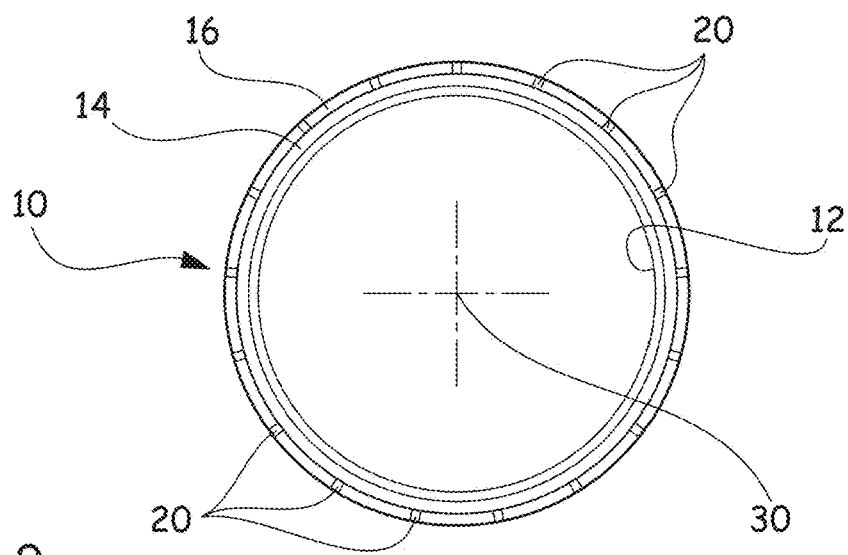
FIG.9

WALL MADE FROM A COMPOSITE MATERIAL REINFORCED SO AS TO LIMIT THE SPREAD OF A CRACK IN A DIRECTION

This application and claims priority to FR 1161514 filed 13 Dec. 2011, the entire contents of which is hereby incorporated by reference.

BACKGROUND

The present invention relates to a wall made from a composite material reinforced so as to limit the spread of a crack in a given direction.

To limit the impact of noise annoyance in aircrafts, techniques have been developed to reduce the noise, in particular by positioning panels or coatings at certain walls aiming to absorb some of the sound energy, in particular using the principle of Helmholtz resonators.

This type of panel comprises, from the outside toward the inside, an acoustically resistive porous layer, at least one cellular structure, and a reflective or impermeable wall. Alternatively, the panel may comprise several superimposed cellular structures between which acoustically resistive porous layers are provided. The cells of the cellular structure(s) are sized so as to ensure optimal acoustic treatment.

"Layer" refers to one or more layers that may or may not be of the same nature.

According to one embodiment, the cellular structure assumes the form of one or more honeycombs made from a composite material.

The reflective wall may be made from a composite material and obtained by draping fibers embedded in a resin matrix.

The acoustically resistive structure is a porous structure playing a dissipative role, partially converting the acoustic energy of the sound wave passing through it into heat. It comprises open areas capable of allowing the acoustic waves to pass, and other closed or solid areas not allowing the sound waves to pass, but designed to ensure the mechanical strength of said layer. This acoustically resistive layer is in particular characterized by an open surface rate that varies essentially as a function of the engine, the components making up said layer.

In general, the acoustically resistive structure comprises at least one porous layer and at least one reinforcing structure.

The porous layer must make it possible to make the acoustic treatment linear and trap the acoustic waves in the Helmholtz cells formed by the cellular structure.

According to one embodiment, the porous layer is a metal fabric, in particular a wire mesh with metal wires having a diameter in the vicinity of 0.1 mm.

According to one advantage, this metal fabric is an excellent conductor for sweeping lightning.

According to one constraint, this wire mesh, which is in contact with the flows of air, must not generate excessive protrusions, such that the diameter of the wires is limited and less than 0.1 mm or 0.2 mm. Beyond that, the wires of the mesh would create aerodynamically prohibitive protrusions.

According to one important point, part of the surface of the metal wire mesh is glued to the other layers of the acoustically resistive structure.

The reinforcing structure assumes the form of a plate made from a composite or metal material in which openings are formed with a larger or smaller section.

According to one embodiment, the reinforcing structure assumes the form of a sheet with round, oblong perforations.

According to the prior art, the porous layer and the reinforcing structure are made independently of one another and are simply connected by gluing so as to be pressed against one another.

Acoustically, the performance of the acoustic treatment panels is improving. They are very strong with respect to certain stresses, for example such as compression forces in the transverse direction (direction perpendicular to the layers) and tensile stresses in a longitudinal direction (direction contained in the plane of the layers). However, these panels are not resilient and may break in the event of impact. Lastly, cracks may spread from a localized damage area along an uncontrolled path.

Consequently, under normal usage conditions, the acoustic treatment panels are satisfactory. However, in case of incidents, if the structure of the aircraft to which the acoustic panel is connected tends to deform, the stresses borne by the panel may cause fissures or cracks to appear, which may spread if the burdens are severe enough, thereby causing the panel to break into several parts. Although acoustic treatment becomes secondary in that situation, it is nevertheless important for the structure of the aircraft to be damaged as little as possible so as to allow it to reach its final destination.

This issue may be generalized to all walls of the aircraft that are made from a composite material, for example such as those forming the fuselage. As for the acoustic treatment panel, it is important to limit the spread of a crack in a given direction so that the structure of the aircraft is damaged as little as possible and to allow the aircraft to continue its mission.

According to a more specific issue, the parts made from a composite material of an aircraft having sections in a transverse plane with a closed perimeter, for example such as a section of the fuselage, an acoustic treatment panel for an air intake, or a section of the wing, have a structure with orbital reinforcements that limit the spread of cracks in a direction perpendicular to the transverse plane. However, these parts made from a composite material have a low resistance to limit the risks of a crack spreading in a transverse plane that may then extend over the entire circumference.

Document U.S. 2005/0112348 proposes a solution for reinforcing a panel that consists of affixing protruding strips on the surface of a panel. These strips may comprise non-metallic reinforcing fibers. This panel may not be used for applications where it is in contact with aerodynamic flows, due to the protruding elements. Furthermore, the nonmetallic fibers do not limit the spread of cracks, as they "break" just as much as the fibers of the layers making up the panel.

SUMMARY OF INVENTION

Consequently, the present invention aims to resolve the drawbacks of the prior art by proposing a wall made from a composite material reinforced so as to limit the spread of a crack in a given direction without, however, excessively impacting the onboard mass of the aircraft.

To that end, the invention relates to a wall made from a composite material comprising at least two layers of fibers embedded in a resin matrix, a crack being able to spread in said wall in a direction of propagation, characterized in that it comprises at least one longilineal metal reinforcement, oriented in a direction secant to the direction of propagation, inserted between two layers of fibers of the wall.

Advantageously, the reinforcement is made from a material having an elongation at break 50% higher than that of the fibers of the layers. Due to the ductile properties of the metals, the metal reinforcements can deform more than the fibers before breaking.

Preferably, the metal reinforcement assumes forms allowing it to be immobilized between the layers of fibers when a tensile force is exerted at one of its ends. This feature allows the metal reinforcements not to move in the matrix while limiting the adhesion between the reinforcement and the adjacent layers. This feature favors deflection of the crack, which tends to spread in the direction of the reinforcement 20.

SUMMARY OF THE DRAWINGS

Other features and advantages will emerge from the following description of the invention, which is provided solely as an example, in light of the appended figures, in which:

FIG. 7 is a cross-sectional view of the reinforcement illustrated in FIG. 6B along cutting line VII-VII, FIG. 8 is a perspective illustration of a panel for the acoustic treatment of an air intake of an aircraft nacelle illustrating the installation of reinforcements, FIG. 9 is a transverse cross-sectional view of the panel of FIG. 8.

DETAILED DESCRIPTION OF THE INVENTION

Figure 1:
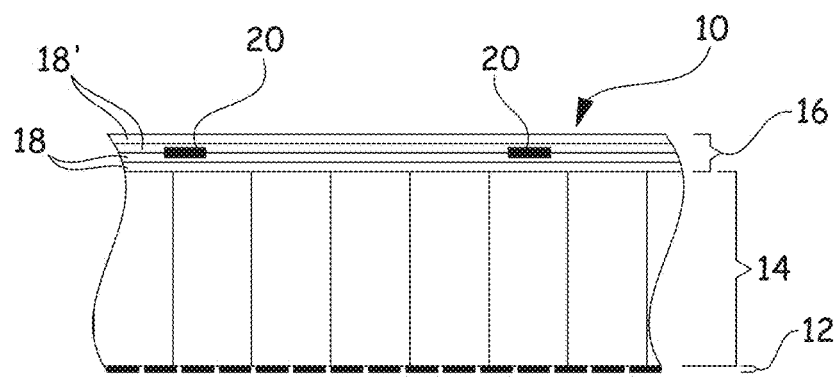
FIG. 1 is a cross-sectional view in a transverse plane of an acoustic treatment panel.

FIG. 1 shows an acoustic treatment panel 10 including, from the outside toward the inside, an acoustically resistive porous layer 12, at least one cellular structure 14, and a reflective or impermeable wall 16.

The acoustically resistive layer 12 and the cellular structure 14 are not described in more detail, as they are known by those skilled in the art and can be made in the same way as those of the acoustic treatment panels according to the prior art.

The acoustically resistive layer 12 and the cellular structure 14 can be made from a composite material. The reflective wall 16 is made from a composite material. It comprises at least two layers of fibers 18, 18' oriented parallel to the plane of the panel and embedded in a resin matrix.

Figure 10:
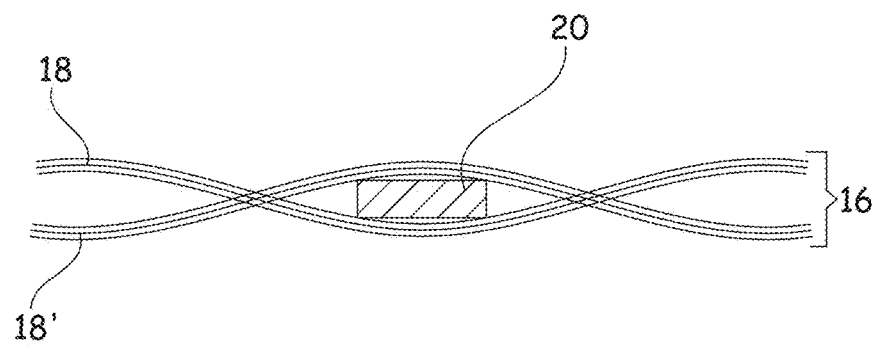
FIG. 10 is a transverse cross-sectional view of a wall according to the invention.

According to one embodiment, the reflective wall 16 comprises at least two layers of fibers 18, 18', which may or may not be woven, and may or may not be pre-impregnated, the layers being draped on one another. The wall may comprise more than two layers of fibers. As illustrated in FIG. 10, the layers 18, 18' may intersect or be interwoven.

According to one embodiment, these fibers can be made from carbon. As an example, to provide an order of magnitude, the carbon fibers have a diameter comprised between 0.005 mm and 0.015 mm, or a section smaller than 0.0002 $mm^2$. The invention is applicable to all types of fibers: short fibers or long fibers.

This wall 16 can be subjected to stresses that may cause a crack, also called a fissure, to appear.

"Crack" refers to the break of at least one ply. It is called a through crack when it passes straight or obliquely through the entire thickness.

In light of the stresses undergone, a crack may spread in a direction called the direction of propagation.

According to the invention, the wall 16 comprises at least one longilineal metal reinforcement 20, arranged to be secant to the direction of propagation of the crack and inserted between two layers of fibers 18, 18'. The reinforcement(s) 20 may be arranged between two parallel layers as shown in FIG. 1, or inserted between layers that intersect and pass above/below the reinforcements, as illustrated in FIG. 10.

The reinforcement is metallic due to the ductile properties of metals, which can deform more than fibers can before breaking. Thus, the material used for the reinforcement must have an elongation at break 50% higher than that of fibers.

"Metal" also encompasses metal alloys and metal matrix nanotechnologies.

"Longilineal" means that the reinforcement has one dimension that is much larger than the other dimensions. As illustrated in FIGS. 6F and 6G, the reinforcement is not necessarily rectilinear, but can have a curved profile, for example such as corrugations.

For the rest of the description, the longitudinal direction X refers to the direction corresponding to the largest dimension of the reinforcement, i.e. its length.

When the reinforcement is not rectilinear, the longitudinal direction at a given point corresponds to the direction of the tangent to the reinforcement at the given point.

"Transverse plane" refers to a plane perpendicular to the longitudinal direction.

According to one important point of the invention, the metal reinforcement 20 must have shapes allowing it to be immobilized between the layers of fibers 18, 18' when a tensile force is exerted at one of its ends and preventing it from moving outward.

To that end, as illustrated in FIGS. 6A to 6E, the reinforcement 20 does not have a constant section, that section varying in the longitudinal direction.

Alternatively, as illustrated in FIGS. 6F and 6G, the reinforcement 20 has a non-rectilinear profile in the longitudinal direction, but for example describes corrugations.

Alternatively, as illustrated in FIG. 6G, the reinforcement 20 comprises fastening points 22 to connect it to at least one of the adjacent layers 18, 18'.

The fact that the metal reinforcement 20 assumes forms allowing it to be immobilized between the layers of fibers 18, 18' when a tensile force is exerted at one of its ends makes it possible to limit the adhesion between the reinforcement 20 and the adjacent layers 18, 18'. Optimally, the outer surface of the reinforcement 20 does not adhere to the adjacent layers 18, 18'. This feature favors the deflection of the crack, which tends to spread in the direction of the reinforcement 20.

According to the invention, the layers of fibers 18, 18' on either side of the metal reinforcement 20 are connected outside the surfaces covered by the reinforcement. In this way, the matrix in which the fibers of the layers and the metal reinforcement(s) are embedded is continuous on either side of the reinforcement(s) 20 and polymerized during a same polymerization phase. The wall does not comprise two distinct assembled matrices on either side of the plane of the reinforcement(s).

Advantageously, the reinforcement 20 assumes the form of a strip, as shown in FIGS. 6A to 6E and 7. This feature makes it possible, at a constant section, for the reinforcement to have a reduced thickness for a reinforcement in strip form as compared to a reinforcement in the form of a cylindrical rod. It is possible to provide a strip with a thickness of 0.5 mm and a width in the vicinity of 0.7 mm, which corresponds to a section of 0.35 mm². To obtain the same section, a cylindrical reinforcement must have a diameter in the vicinity of 0.65 mm. Providing a reinforcement in the form of a strip makes it possible to limit overthicknesses, and therefore the risks of breaking the fibers of the adjacent layers.

According to another advantage, providing a reinforcement in the form of a strip makes it possible to limit the risks of shearing of the fibers relative to a reinforcement with a circular section, which may behave like a cutting thread.

Figure 6A:
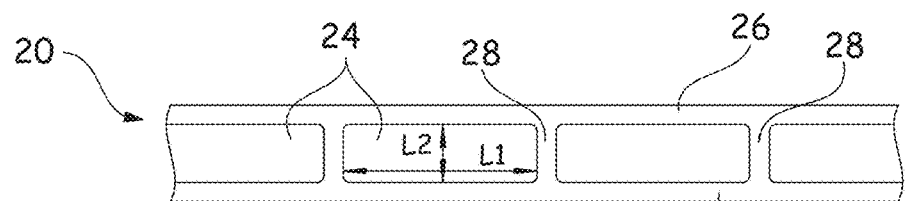
FIGS. 6A to 6G are lateral views of reinforcements according to various alternatives of the invention.
Figure 6B:
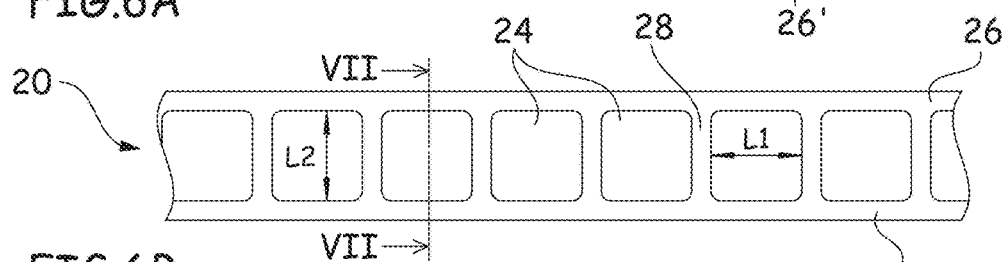
Figure 6C:
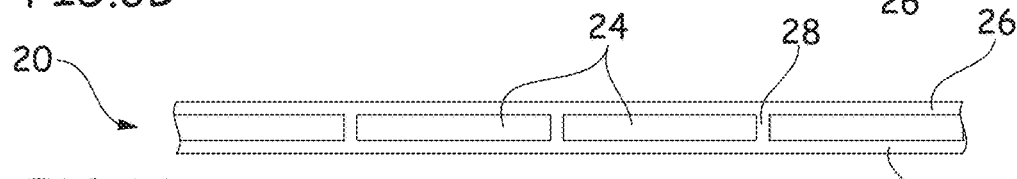
Figure 6D:
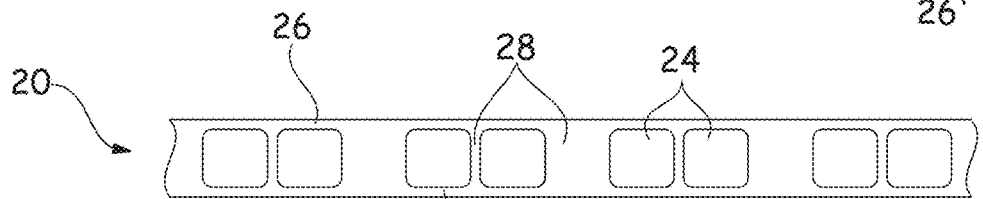
Figure 6E:
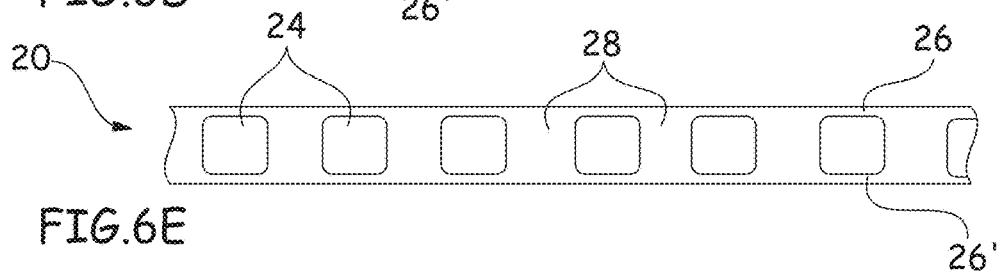
Figure 6F:
Figure 6G:
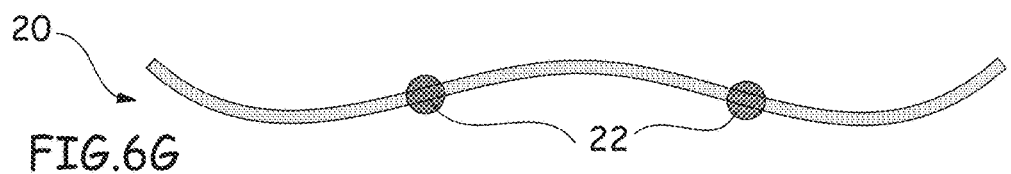

According to one preferred embodiment illustrated in FIGS. 6A and 6E, the reinforcement assumes the form of a metal strip with recesses 24 with a width smaller than that of the reinforcement and arranged symmetrically relative to the longitudinal median axis of the strip. These recesses define two posts 26, 26' at the strip, said posts being arranged at the longitudinal edges of the strip (parallel to the longitudinal direction) and connected by crosspieces 28. The adjacent layers 18 and 18' are embedded in the same matrix at the recesses.

To provide an order of magnitude, a reinforcement has a width in the vicinity of 30 mm, as illustrated in FIGS. 6A and 6B, in the vicinity of 20 mm as illustrated in FIGS. 6D and 6E, or the vicinity of 10 mm as illustrated in FIG. 6C.

The posts 26, 26' may or may not have the same width. The width of the posts may vary from 2 to 10 mm.

The recesses 24 may be regularly spaced apart, as illustrated in FIGS. 6A to 6C and 6E, or may have different spaces between them, as illustrated in FIG. 6D.

The recesses 24 may have a dimension L1 in the longitudinal direction that is identical or at most equal to two times the dimension L2 in the transverse direction, as illustrated in FIGS. 6B, 6D, 6E.

Alternatively, as illustrated in FIGS. 6A and 6C, the dimension L1 of the recesses is larger than or equal to two times the dimension L2.

Lastly, the posts 26, 26' and the crosspieces 28 may have substantially identical widths, as illustrated in FIGS. 6A to 6C, or certain crosspieces 28 may have a width much larger than that of the posts, as illustrated in FIGS. 6D and 6E.

According to one preferred embodiment, a metal reinforcement 20 has a width in the vicinity of 30 mm and a thickness of the vicinity of 0.5 mm, the posts and the crosspieces have a width in the vicinity of 2 to 4 mm, the recesses are regularly spaced apart and have a dimension L1 of 30 to 35 mm and a dimension L2 in the vicinity of 25 mm.

As illustrated in FIGS. 8 and 9, in the case of a reflective wall 16 of an acoustic treatment panel 10 in the form of a tube portion with an axis 30, reinforcements 20 should be provided oriented parallel to the axis 30, (preferably regularly) distributed over the circumference. Advantageously, in the case of a cylindrical wall of an air intake, 12 to 35 reinforcements should be provided regularly distributed over the periphery, which form an angle varying from approximately 10 to 30° between them. Advantageously, 16 to 18 reinforcement should be provided.

In the case of a wall of a pressurized fuselage, not only should the spread of a crack be limited, but sealing of the wall should also be ensured. In that case, the reinforcements are arranged closer together and forming an angle varying from approximately 2 to 10° between them.

More generally, in the case of a wall made from a composite material of an aircraft having sections in parallel planes with a closed perimeter, for example such as the fuselage or a wing, the reinforcements are arranged between the layers of the wall and oriented in a direction perpendicular to the section planes.

When they are incorporated into a wall in which a crack may spread in a direction of propagation, the reinforcements 20 are spaced apart by a distance greater than or equal to 5 times the width of the reinforcement in the direction of propagation. Preferably, they are oriented perpendicular to the direction of propagation, which must be avoided as a priority.

Figure 2:
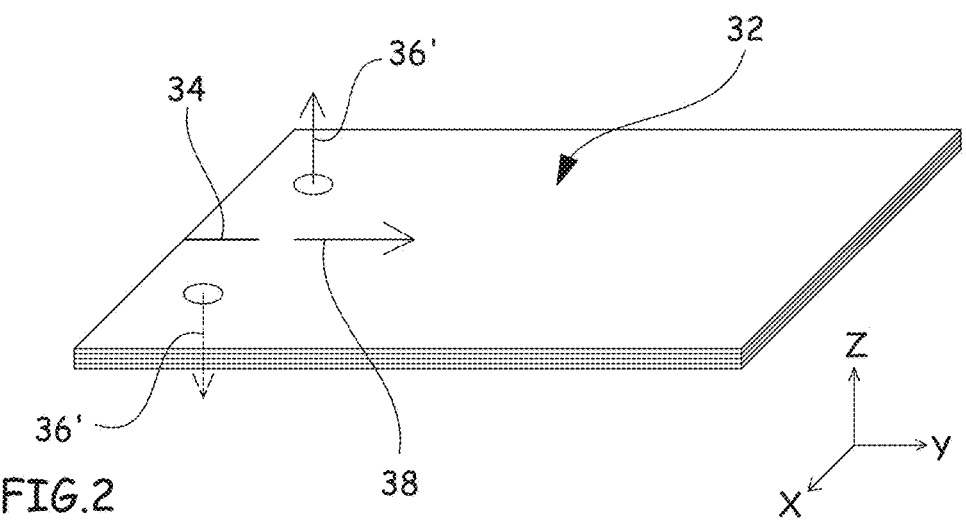
FIG. 2 is a diagram illustrating a plate made from a reference composite material.

In FIG. 2, a test piece 32 is provided in the form of a plate made from a composite material, comprising at least two layers of fibers.

This test piece 32 comprises a crack 34 and is subjected to tensile forces 36, 36' arranged on either side of the crack 34 oriented in opposite directions, in a direction Z that is perpendicular to the plane of the test piece, so as to cause the crack 34 to spread in a direction Y embodied by the arrow 38.

The reference test piece 32 does not comprise any reinforcements and comprises a superposition of plies, for example 7 plies, certain plies having fibers oriented in the longitudinal direction, other fibers oriented at +/−45° relative to the longitudinal direction. According to one embodiment, the fibers are made from carbon and embedded in an epoxy resin.

Figure 3A:
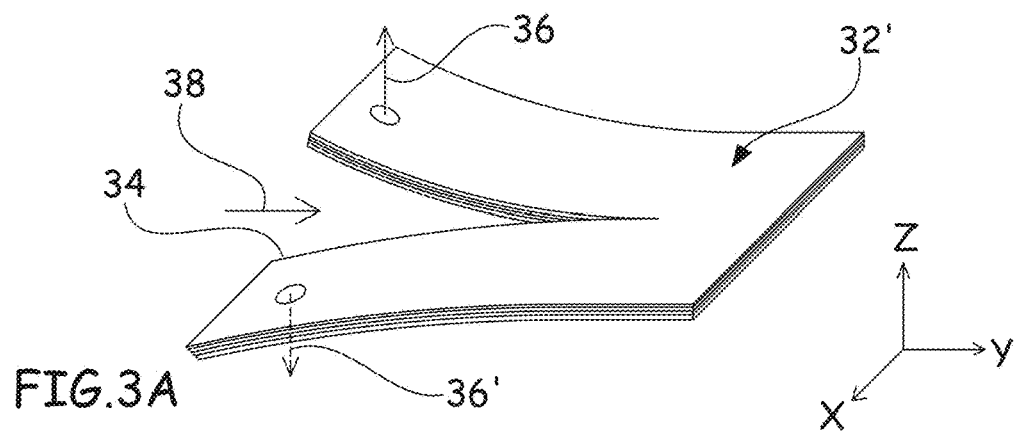
FIG. 3A is a diagram illustrating a plate made from a composite material reinforced with additional plies of fabric in which a crack has spread.

In FIG. 3A, the test piece 32' has been reinforced by the addition of plies of the same nature. In this way, the test piece 32' comprises 20% additional plies, which amounts to a 20% increase in the mass of the test piece.

The test piece 32' is subjected to the same stresses as the test piece 32. As illustrated in FIG. 3A, the crack tends to spread in the direction of propagation.

Figure 4:
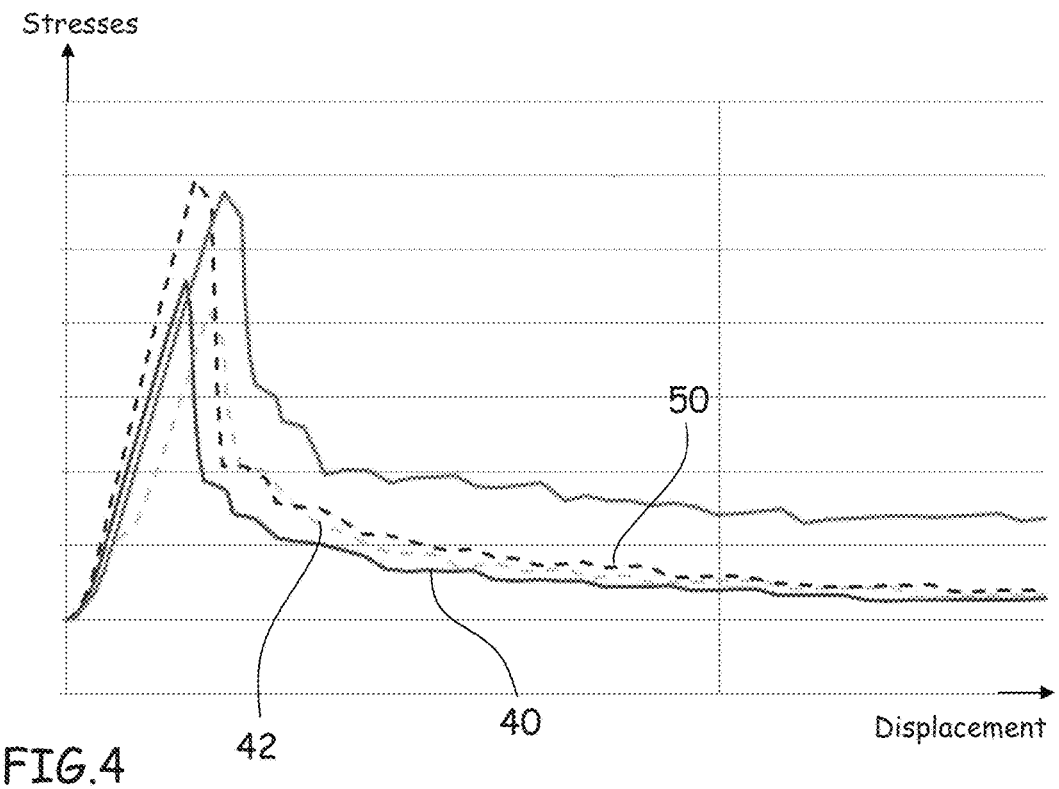
FIG. 4 shows curves for tensile strength tests on plates in a direction parallel to the reinforcements respectively without reinforcements, with additional plies, with Kevlar reinforcements, and with metal reinforcements.

As shown by the curves of FIG. 4, the tensile gain in the longitudinal direction X is 15% between the curve 40, which corresponds to the reference test piece 32, and the curve 42, which corresponds to the test piece 32'.

Figure 5:
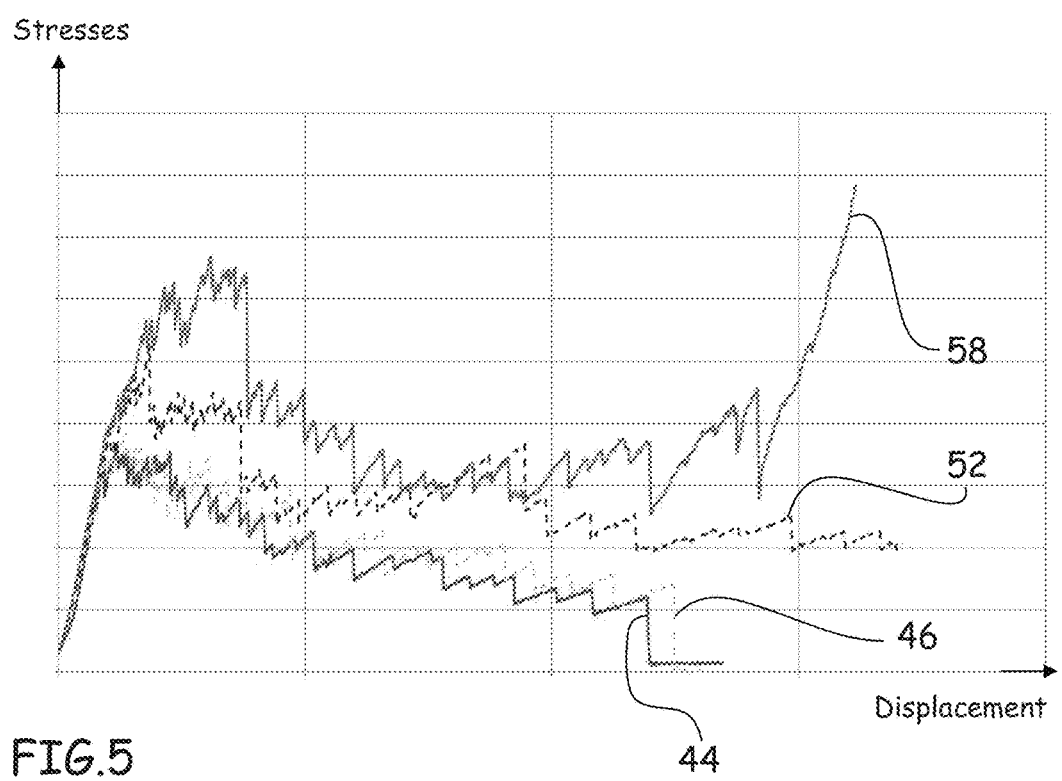
FIG. 5 shows curves for tensile strength tests on plates in a direction perpendicular to the plates respectively without reinforcements, with additional plies, with Kevlar reinforcements, and with metal reinforcements.

As illustrated in FIG. 5, the tensile gain in the perpendicular direction Z is 2% between the curve 44, which corresponds to the test piece 32, and the curve 46, which corresponds to the test piece 32'.

Thus, despite a 20% increase in the mass, a gain of only 2% is obtained regarding the limitation of the spread of the crack, which spreads identically to that of the test piece 32 without reinforcements.

Figure 3B:
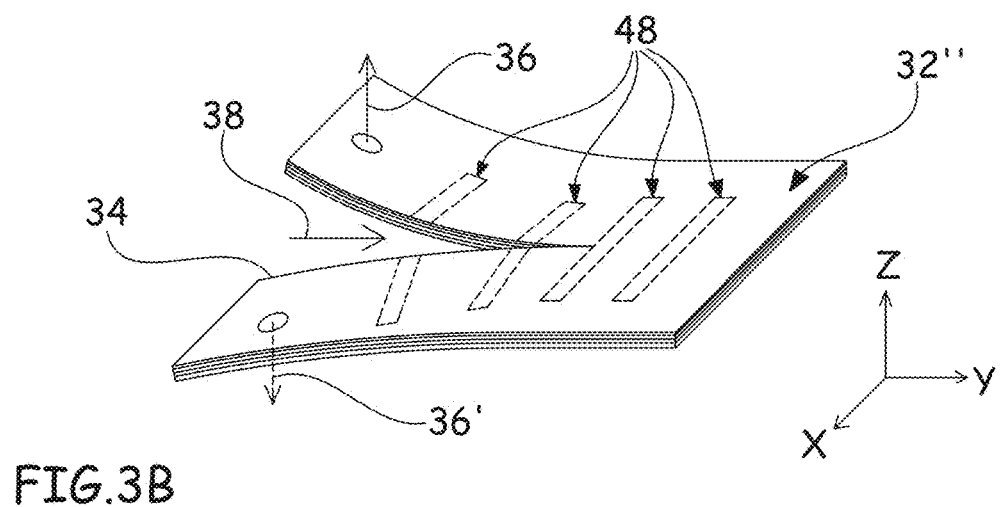
FIG. 3B is a diagram illustrating a plate in which a crack has spread made from a reinforced composite material with reinforcements in the form of Kevlar strips.

In FIG. 3B, the test piece 32" has been reinforced by adding reinforcements 48 in the form of Kevlar strips. The test piece 32″ thus has a mass 5% higher compared to the reference test piece 32. As illustrated in FIG. 3B, the crack tends to spread in the direction of propagation Y.

As shown by the curves of FIG. 4, the tensile gain in the longitudinal direction X is 15% between the curve 40, which corresponds to the reference test piece 32, and the curve 50, which corresponds to the test piece 32″.

As illustrated in FIG. 5, a tensile gain in the perpendicular direction Z is 50% between the curve 44, which corresponds to the test piece 32, and the curve 52, which corresponds to the test piece 32″.

Figure 3C:
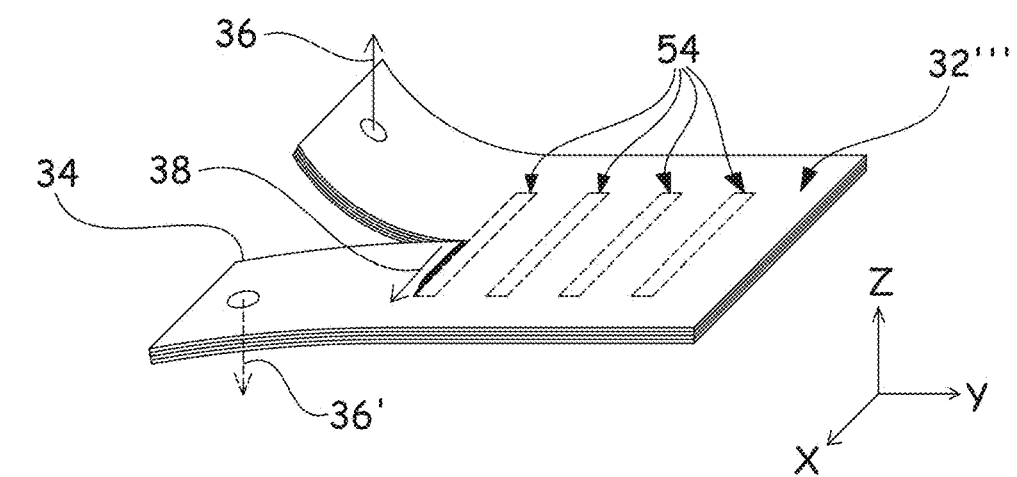
FIG. 3C is a diagram illustrating a plate made from a composite material reinforced with metal reinforcements according to the invention that have made it possible to deflect the spread of a crack.

In FIG. 3C, the test piece 32‴ has been reinforced by adding metal reinforcements 54 according to the invention, spaced apart in the direction of propagation Y. The test piece 32‴ has a mass 2% higher compared to the reference test piece 32. As illustrated in FIG. 3C, the crack tends to spread in the direction of propagation Y as far as the reinforcement, then is deflected and tends to spread in the longitudinal direction X.

As shown by the curves of FIG. 4, the tensile gain in the longitudinal direction X is 30% between the curve 40, which corresponds to the referenced test piece 32, and the curve 56, which corresponds to the test piece 32‴.

As illustrated in FIG. 5, a tensile gain in the perpendicular direction Z is 120% between the curve 44, which corresponds to the test piece 32, and the curve 58, which corresponds to the test piece 32‴.

Thus, as shown by this trial, the crack does not spread in the direction of propagation, but is deflected owing to the reinforcements according to the invention. Furthermore, it will be noted for the test piece with metal reinforcements according to the invention that there is a much greater gain compared to the other test pieces with a more limited impact on the mass. These trials overcome a prejudice of those skilled in the art tending to think only of the iso-mass; composite materials have better mechanical properties than metals, with the result that metal aircraft parts are replaced by elements made from a composite material.

The invention claimed is:

1. A wall made from a composite material comprising:
at least two layers of carbon fibers embedded in a resin matrix and the at least two layers of carbon fibers being in direct contact with each other over a majority of an area of each of the at least two layers of carbon fibers, wherein the at least two layers of carbon fibers have a crack propagation tendency direction; and
at least one longilineal metal reinforcement oriented in a direction secant to the crack propagation tendency direction and the at least one longilineal metal reinforcement is inserted between the at least two layers of carbon fibers and is embedded in the resin matrix, wherein the at least one longilineal metal reinforcement is made from a material having an elongation at break that is 50% higher than that of the carbon fibers of the at least two layers, the at least one longilineal metal reinforcement has a cross section which varies in area along the length of the at least one longilineal metal reinforcement and the outer surface of the at least one longilineal metal reinforcement is not adhered to the at least two layers of carbon fibers.

2. The wall made from a composite material according to claim 1, wherein the at least one longilineal metal reinforcement is immobilized between the layers of carbon fibers while a tensile force is exerted at an end of the at least one longilineal metal reinforcement.

3. The wall made from a composite material according to claim 1, wherein the at least one metal reinforcement in shaped as at least one strip inserted between the at least two layers of carbon fibers.

4. The wall made from a composite material according to claim 3, wherein the at least one metal reinforcement is shaped as at least one metal strip including recesses each having a width narrower than that of the at least one metal reinforcement and the recesses are arranged symmetrically along the longitudinal median axis of the at least one metal reinforcement.

5. The wall made from a composite material according to claim 4, wherein the at least one metal reinforcement has a width of substantially 30 mm.

6. The wall made from a composite material according to claim 4, wherein the at least one metal reinforcement has a thickness of substantially 0.5 mm.

7. The wall made from a composite material according to claim 4, wherein the recesses are spaced apart by distances in a range of 2 to 4 mm and each of the recesses has a length of 30 to 35 mm and a width of substantially 25 mm.

8. The wall made from a composite material according to claim 1, wherein said at least one longilineal metal reinforcement comprises several reinforcements spaced apart by a distance greater than or equal to 5 times a width of each of the reinforcements.

9. The wall made from a composite material according to claim 1, wherein said wall includes sections arranged to form a closed perimeter, and said wall further comprises the composite material with the at least two layers of carbon fibers and at least one longilineal metal reinforcements regularly distributed over a surface of the sections forming the closed perimeter.

10. The wall made from a composite material according to claim 1, wherein said wall includes sections arranged in a closed perimeter and the composite material forms a cover over the sections and extending around the closed perimeter.

11. The wall made from a composite material according of claim 1 wherein the least one longilineal metal reinforcement is immobilized between the at least two layers of carbon fiber.

12. An acoustic wall at least partially made from a fiber reinforced composite material, said reinforced composite material comprising:
at least two layers of carbon fibers embedded in a resin matrix and the at least two layers of carbon fibers in direct contact with each other over a majority of an area of each of the layers, wherein the at least two layers have a first direction aligned with the carbon fibers; and
at least one longitudinally extending reinforcement embedded in the resin matrix and extending in a second direction which is at an acute angle or perpendicular to the first direction and the at least one longitudinally extending reinforcement is between the at least two layers of carbon fibers, wherein the at least one longitudinally extending reinforcement is made from a material having an elongation at break that is 50% higher than that of the carbon fibers of the at least two layers, the at least one longitudinally extending reinforcement has a cross section which varies in area along the length of the at least one longitudinally extending reinforcement and the outer surface of the at least one longitudinally extending reinforcement is not adhered to the at least two layers of carbon fibers.

13. The wall according to claim 12, wherein the at least one longitudinally extending reinforcement comprises a metal material.

14. The wall according to claim 12, wherein the at least one longitudinally reinforcement includes a metal strip with recesses, wherein each recess has a width narrower than that of the at least one longitudinally reinforcement, and said recesses are symmetrically arranged along a longitudinal axis of the at least one longitudinally reinforcement.

15. The wall according to claim 12, wherein said at least one longitudinally extending reinforcement comprises a plurality of longitudinally extending reinforcements spaced apart in the first direction by a distance greater than or equal to five times a width of the at least one longitudinally extending reinforcement.

16. The wall according to claim 12, wherein said wall further comprises wall sections arranged in a closed perimeter, and said wall sections comprise the reinforced composite material.

17. The acoustic wall of claim 12 wherein the at least one longitudinally extending reinforcement is immobilized between the at least two layers of carbon fiber.

18. An acoustic treatment panel comprising:
   layers of carbon fibers and at least two of the layers of carbon fibers are in direct contact with each other over a majority of an area of each of the two layers;
   reinforcement strips between the carbon fiber layers, wherein the reinforcement strips having a length dimension greater than five times of a width dimension, the reinforcement strips are made from a material having an elongation at break that is 50% higher than that of the carbon fibers, the reinforcement strips have a cross section which varies in area along the length of the reinforcement strips and the outer surfaces of the reinforcement strips are not adhered to the layers of carbon fibers; and
   a resin matrix embedding together the layers and the reinforcement strips, wherein the reinforcement strips are arranged at acute angles greater than zero or at right angles to a direction of potential crack propagation through the layers.

19. The acoustic treatment panel of claim 18 wherein the reinforcement strips are parallel to each other.

20. The acoustic treatment panel of claim 18 wherein the reinforcement strips include recesses symmetrically arranged along a length of each of the reinforcement strips.

21. The acoustic treatment panel of claim 18 wherein the reinforcement strips have a cross section varying in shape along a length of each of the reinforcement strips.

22. The acoustic treatment panel of claim 18 wherein a length of each of the reinforcement strips is greater than five times a width of the corresponding reinforcement strips.

23. The acoustic treatment panel of claim 18 wherein the panel is configured to be assembled with other acoustic treatment panels to form a wall having a closed perimeter.

24. The acoustic treatment panel of claim 18 wherein the at least one longitudinally extending reinforcement is immobilized between the at least two layers of the carbon fibers.

25. The acoustic treatment panel of claim 18 further comprising:
   an acoustically resistive porous layer, and
   a cellular layer having a honeycomb structure, wherein the cellular layer includes a first surface adjacent the acoustically resistive porous layer and a second surface adjacent one of the layers of the carbon fibers.

26. A panel having a width and a length, and comprising:
   overlapping layers of carbon fibers, wherein each of the layers extends the width and the length of the panel and wherein the overlapping layers of carbon fibers are in direct contact with each other over a majority of an area of the panel;
   at least one longilineal metal reinforcement between the overlapping layers of carbon fibers, having a length greater than a width, and the length is oriented parallel to the width or length of the panel, wherein the length and width of the at least one longilineal metal reinforcement are each smaller than the length and width, respectively, of the overlapping layers of carbon fibers, the at least one longilineal metal reinforcement is made from a material having an elongation at break that is 50% higher than that of the carbon fibers, the at least one longilineal metal reinforcement has a cross section which varies in area along the length of the at least one longilineal metal reinforcement and the outer surface of the at least one longilineal metal reinforcement is not adhered to the layers of carbon fibers; and
   a resin matrix embedding the overlapping layers of carbon fibers and the at least one longilineal metal reinforcement, wherein the resin matrix continues beyond sides of the at least one longilineal metal reinforcement.

27. The panel of claim 26 wherein the panel includes one or more of the panels arranged as a tube, and the length of the panel corresponds to a length of the tube and a width of the panel corresponds to a perimeter of the tube.

* * * * *